US009994088B2

(12) United States Patent
Roy

(10) Patent No.: US 9,994,088 B2
(45) Date of Patent: Jun. 12, 2018

(54) WIPER ASSEMBLY FOR A WINDSHIELD OF A VEHICLE

(71) Applicant: BOMBARDIER RECREATIONAL PRODUCTS INC., Valcourt (CA)

(72) Inventor: Nicolas Roy, Richelieu (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 21 days.

(21) Appl. No.: 15/087,437

(22) Filed: Mar. 31, 2016

(65) Prior Publication Data

US 2017/0282865 A1 Oct. 5, 2017

(51) Int. Cl.
*B60J 1/00* (2006.01)
*B60S 1/50* (2006.01)
*B60S 1/04* (2006.01)
*B60S 1/52* (2006.01)

(52) U.S. Cl.
CPC ............. *B60J 1/002* (2013.01); *B60S 1/0466* (2013.01); *B60S 1/50* (2013.01); *B60S 1/522* (2013.01)

(58) Field of Classification Search
None
See application file for complete search history.

(56) References Cited

U.S. PATENT DOCUMENTS

| 2004/0117937 | A1* | 6/2004 | Maruyama | B05B 1/08 15/250.02 |
| 2006/0282971 | A1* | 12/2006 | Makihara | B60S 1/3406 15/250.04 |
| 2014/0298607 | A1* | 10/2014 | Yasumoto | B60S 1/522 15/250.04 |
| 2015/0143655 | A1* | 5/2015 | Caillot | B60S 1/524 15/250.04 |

* cited by examiner

*Primary Examiner* — Eric W Golightly
(74) *Attorney, Agent, or Firm* — BCF LLP

(57) ABSTRACT

A vehicle has a frame, at least one seat, an engine, a plurality of ground engaging members, a windshield, and a wiper assembly connected to the upper portion of the windshield. The wiper assembly has a wiper motor, a reservoir, a wiper arm pivotally connected to the upper portion of the windshield, a wiper blade connected to the wiper arm, and a sprayer connected to the wiper arm and fluidly connected to the reservoir. The wiper motor selectively pivots the wiper arm and the wiper blade between a stowed position and a pivoted position. The wiper blade has a first side and a second side. The first side is above the second side in the stowed position. The sprayer is configured for spraying a fluid only on the surface of the windshield away from the first side of the wiper blade. A method for wiping a windshield is also disclosed.

20 Claims, 14 Drawing Sheets

WIPER ASSEMBLY FOR A WINDSHIELD OF A VEHICLE

TECHNICAL FIELD

Figure 1:
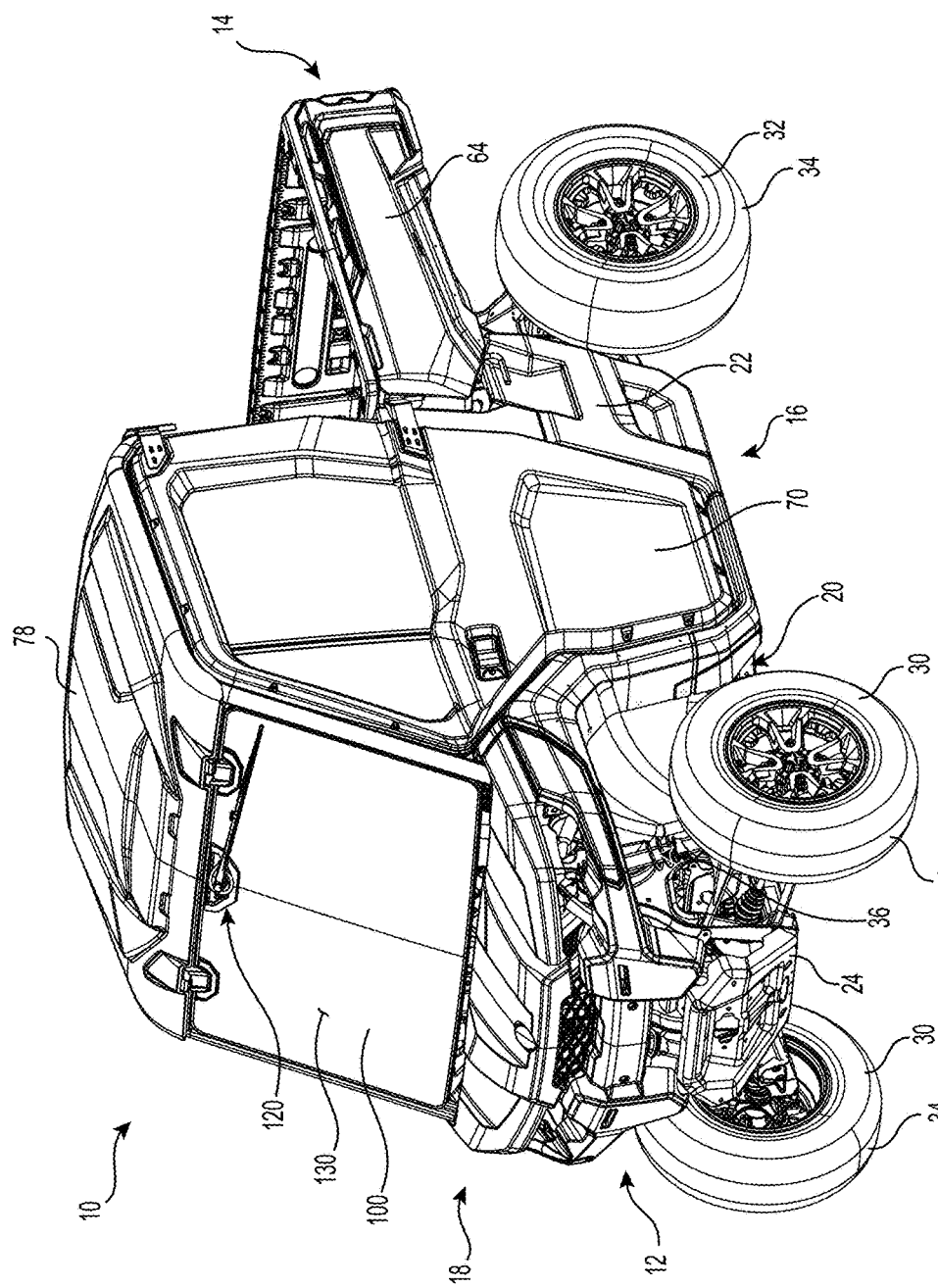

The present technology relates to a wiper assembly for a windshield of a vehicle and a vehicle having the wiper assembly.

BACKGROUND

Side-by-side vehicles (SSVs) are off-road vehicles that are often used for transporting passengers and a large variety of different items, from sporting equipment to construction materials, in various terrains and conditions.

Some SSVs include a windshield for protecting the passengers from wind, rain, snow, sand, dirt and debris when operating the SSV. In order to clean the windshield, a windshield wiper assembly can be useful to remove liquids and solids soiling the windshield. Known windshield wiper assemblies generally comprise a wiper motor, a wiper arm connected to the wiper motor and a wiper blade connected to the wiper arm and in contact with a surface of the windshield. The wiper motor can pivot the wiper arm back and forth between a stowed position and a pivoted position, opposite to the stowed position, until a preprogrammed amount of time is spent or until the user turns off the wipers. At that time, the wiper arm returns to the stowed position. Known wiper assemblies sometimes further comprise an assembly for spraying a fluid, such as a washer fluid, onto the windshield to help remove debris and to further clean the windshield. When the fluid is sprayed onto the windshield, the wiper motor is activated so that the wiper blade wipes away the liquid and debris on the windshield.

Wiper assemblies typically pivot from either a top portion or a bottom portion of the windshield. When the wiper assembly pivots from the bottom portion of the windshield, liquids and debris that remain on the wiper blade do not drain across the windshield.

In contrast, when the wiper assembly pivots from the upper portion of the windshield, in the event that a fluid is sprayed onto the windshield such that both sides of the wiper blade make contact with the fluid when the wiper assembly is turned on, the wiper blade can leave a line of liquids and debris on the windshield at the stowed position and at the pivoted position. When the wiper assembly is turned off, the line of liquids and debris formed at the stowed position and located above the wiper blade can drain along the wiper blade until an outer end thereof and then along an outer edge of the windshield, thus minimizing the obstruction of the view of the passengers. However, when the wiper assembly is turned off, the line of liquids and debris formed at the pivoted position drains down across the passenger side of the windshield and obstructs the view of the passenger.

As such, it may be desirable to have a windshield wiper assembly that pivots from an upper portion of a windshield that is configured for minimizing such issues related to the wiping and cleaning of a windshield.

SUMMARY

It is an object of the present to ameliorate at least some of the inconveniences present in the prior art.

According to one aspect of the present technology, there is provided a vehicle having a frame, at least one seat connected to the frame, an engine connected to the frame, a plurality of ground engaging members, a windshield connected to the frame, and a wiper assembly connected to the upper portion of the windshield. The wiper assembly has a wiper motor connected to the upper portion of the windshield, a reservoir connected to the frame, a wiper arm pivotally connected to the upper portion of the windshield, the wiper arm being operatively connected to the wiper motor, the wiper motor selectively pivoting the wiper arm between a stowed position and a pivoted position, a wiper blade connected to the wiper arm, the wiper blade being in contact with a surface of the windshield, the wiper blade being pivotable with the wiper arm between the stowed position and the pivoted position, the wiper blade having a first side and a second side, the first side being above the second side in the stowed position, the first side being below the second side in the pivoted position, and a sprayer connected to the wiper arm, the sprayer being fluidly connected to the reservoir, the sprayer being configured for spraying a fluid only on the surface of the windshield away from the first side of the wiper blade.

In some implementations, the wiper motor is positioned on an interior side of the windshield and the wiper arm is positioned on an exterior side of the windshield.

In some implementations, the wiper assembly also has a wiper motor housing connected to the interior side of the windshield, the wiper motor being received in the wiper motor housing.

In some implementations, the wiper assembly also has an actuator electronically connected to the wiper motor for selectively causing the wiper motor to pivot the wiper arm between the stowed position and the pivoted position.

In some implementations, when the wiper arm is in the stowed position, at least a majority of the wiper blade is on a driver side of the windshield.

In some implementations, when the wiper arm is in the stowed position, the wiper blade extends downwardly from an inner end to an outer end of the wiper blade.

In some implementations, when the wiper arm is in the pivoted position, at least a majority of the wiper blade is on a passenger side of the windshield.

In some implementations, when the wiper arm is in the pivoted position, the wiper blade extends downwardly from an inner end to an outer end of the wiper blade.

In some implementations, the windshield is pivotally connected to the frame.

In some implementations, hinges pivotally connect the upper portion of the windshield to the frame.

In some implementations, the wiper motor, the wiper arm and the wiper blade pivot together with the windshield.

In some implementations, the wiper arm pivots about a pivot axis, the pivot axis being at a lateral center of the windshield.

In some implementations, the wiper assembly also has a shaft. The shaft is operatively connected to the wiper motor and to the wiper arm. The shaft is coaxial with a pivot axis of the wiper arm. The wiper motor selectively pivots the shaft and the wiper arm about the pivot axis.

In some implementations, the sprayer is positioned between and spaced apart from the ends of the wiper arm.

In some implementations, the sprayer has a first spray outlet and a second spray outlet.

In some implementations, the wiper assembly also has a pump fluidly connected to the reservoir for pumping the fluid from the reservoir to the sprayer.

In some implementations, the wiper assembly also has at least one actuator electronically connected to the wiper motor for selectively causing the wiper motor to pivot the wiper arm between the stowed position and the pivoted position. The at least one actuator is further electronically connected to the pump for selectively pumping the fluid from the reservoir to the sprayer.

In some implementations, the wiper assembly also has a conduit extending between the reservoir and the sprayer for delivering the fluid from the reservoir to the sprayer. The conduit has at least one hose.

In some implementations, the wiper arm defines a channel and at least a portion of the at least one hose is received in the channel of the wiper arm.

In some implementations, the sprayer is positioned above the wiper blade when the wiper arm is in the stowed position, and the sprayer is positioned below the wiper blade when the wiper arm is in the pivoted position.

According to a further aspect of the present technology, there is provided a method for wiping a windshield of a vehicle. The method has the steps of pivoting a wiper blade from a stowed position to a pivoted position along a surface of the windshield, the wiper blade having a first side and a second side, the first side being above the second side in the stowed position, the first side being below the second side in the pivoted position; spraying fluid on the surface of the windshield away from the first side of the wiper blade in a direction opposite to a direction of motion of the wiper blade as the wiper blade pivots from the stowed position to the pivoted position; and pivoting the wiper blade from the pivoted position to the stowed position along the surface of the windshield.

For the purposes of the present application, terms related to spatial orientation such as forward, rearward, front, rear, upper, lower, left, and right, are as they would normally be understood by a driver of the vehicle sitting thereon in a normal driving position with the vehicle being upright and steered in a straight ahead direction.

Should there be any difference in the definitions of term in this application and the definition of these terms in any document included herein by reference, the terms as defined in the present application take precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 is a front, left side perspective view of a side-by-side vehicle;

FIG. 2 is a left side elevation view of the vehicle of FIG. 1, with the doors and the roof removed;

FIG. 3 is a front, right side perspective view of a portion of the vehicle of FIG. 1 showing part of the vehicle body and the cockpit area;

FIG. 4 is a rear, right side perspective view of a powertrain of the vehicle of FIG. 1;

FIG. 5 is a front, left side perspective view of a portion of the vehicle of FIG. 1, with a wiper arm in a stowed position;

FIG. 6 is a front, left side perspective view of a portion of the vehicle of FIG. 1, with the wiper arm in a pivoted position;

FIG. 7 is a front, left side perspective view of a portion of the vehicle of FIG. 1, with the windshield pivoted upwardly;

FIG. 8 is a rear, left side perspective view of a portion of the vehicle of FIG. 1 showing part of a wiper assembly;

FIG. 9 is rear elevation view of the windshield of the vehicle of FIG. 1, with the wiper arm in the stowed position and a wiper motor housing in the upper portion of the windshield;

FIG. 10 is a close-up, rear, left side perspective view of the wiper motor housing of FIG. 9;

FIG. 11 is a close-up, rear, left side perspective view of components housed in the wiper motor housing;

FIG. 12 is a rear perspective view showing part of the wiper assembly of the vehicle of FIG. 1;

FIG. 13 is a close-up of section 13-13 of FIG. 12; and

FIG. 14 is an exploded, left side perspective view of the windshield and of the wiper assembly of the vehicle of FIG. 1.

DETAILED DESCRIPTION

The present technology will be described herein with respect to a side-by-side vehicle (SSV) designed to accommodate three riders (one driver and two passengers) seated side-by-side in a cockpit area. However, it is contemplated that at least some aspects of the present technology could be adapted for use on other kinds of vehicles such as, but not limited to, SSVs designed to accommodate more or less than three passengers and all-terrain vehicles (ATVs).

FIGS. 1 to 3 illustrate a vehicle 10 having a front end 12, a rear end 14, and left and right sides 16, defined consistently with the forward travel direction of the vehicle 10. The vehicle 10 includes a vehicle body 18, to which the other parts of the vehicle 10 are connected. The vehicle body 18 includes a frame 20 and a plurality of body panels 22. The frame 20 has a front portion 24, a middle portion 26 and a rear portion 28.

The vehicle 10 includes a pair of front wheels 30 and a pair of rear wheels 32 (only the left rear wheel 32 is shown in FIG. 1). Each one of the wheels 30, 32 has a tire 34. Each front wheel 30 is suspended from the front portion 24 of the frame 20 via a front suspension assembly 36. Each rear wheel 32 is suspended from the rear portion 28 of the frame 20 via a rear suspension assembly 38. Ground engaging members other than wheels 30, 32 are contemplated for the vehicle 10, such as tracks or skis. In addition, although four ground engaging members are illustrated in the Figures, the vehicle 10 could include more or less than four ground engaging members. Furthermore, different combinations of ground engaging members, such as tracks used in combination with skis, are contemplated.

Referring to FIGS. 2 to 4, the vehicle 10 further includes a powertrain 40, which will now be briefly described. An engine 42 is mounted to the rear portion 28 of the frame 20. The engine 42 drives the front and rear wheels 30, 32. It is contemplated that the engine 42 could selectively switch between driving two and four of the wheels 30, 32. It is also contemplated that the engine 42 could drive only the front wheels 30 or only the rear wheels 32. In the implementation shown, the engine 42 is a four-stroke V-twin engine. It is contemplated that other types of motors could be used in the powertrain 40, such as an electric motor. The engine 42 has an output shaft (not shown) extending horizontally and laterally. The engine 42 is connected to a transmission 44.

The transmission 44 transfers the torque from the engine 42 to a front driveshaft (not shown) and a rear differential 46. The front driveshaft passes through a casing of the engine 42 and connects to another front driveshaft 48 via a universal joint 50. The front end of the front driveshaft 48 connects to another universal joint 52. The universal joint 52 connects the front driveshaft 48 to a front differential 54. The front differential 54 is operatively connected to left and right front drive axles 56. The front drive axles 56 are connected to spindles 58 of the front wheels 30, thus operatively connecting the front wheels 30 to the engine 42. The rear differential 46 is operatively connected to left and right rear drive axles 60. The rear drive axles 60 are connected to spindles 62 of the rear wheels 32, thus operatively connecting the rear wheels 32 to the engine 42. The powertrain 40 is further configured to power an electrical system of the vehicle 10.

Figure 2:
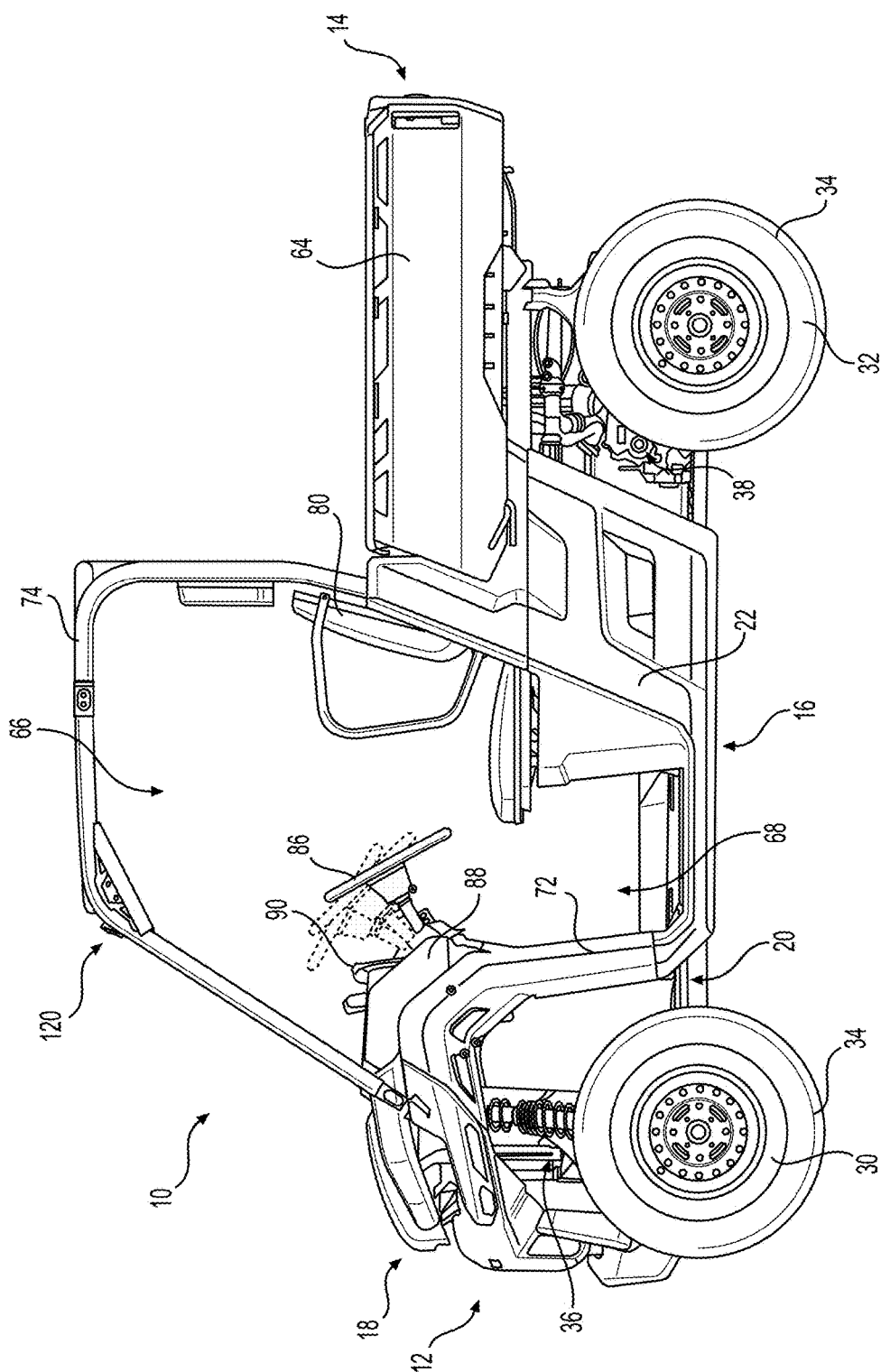
Figure 3:
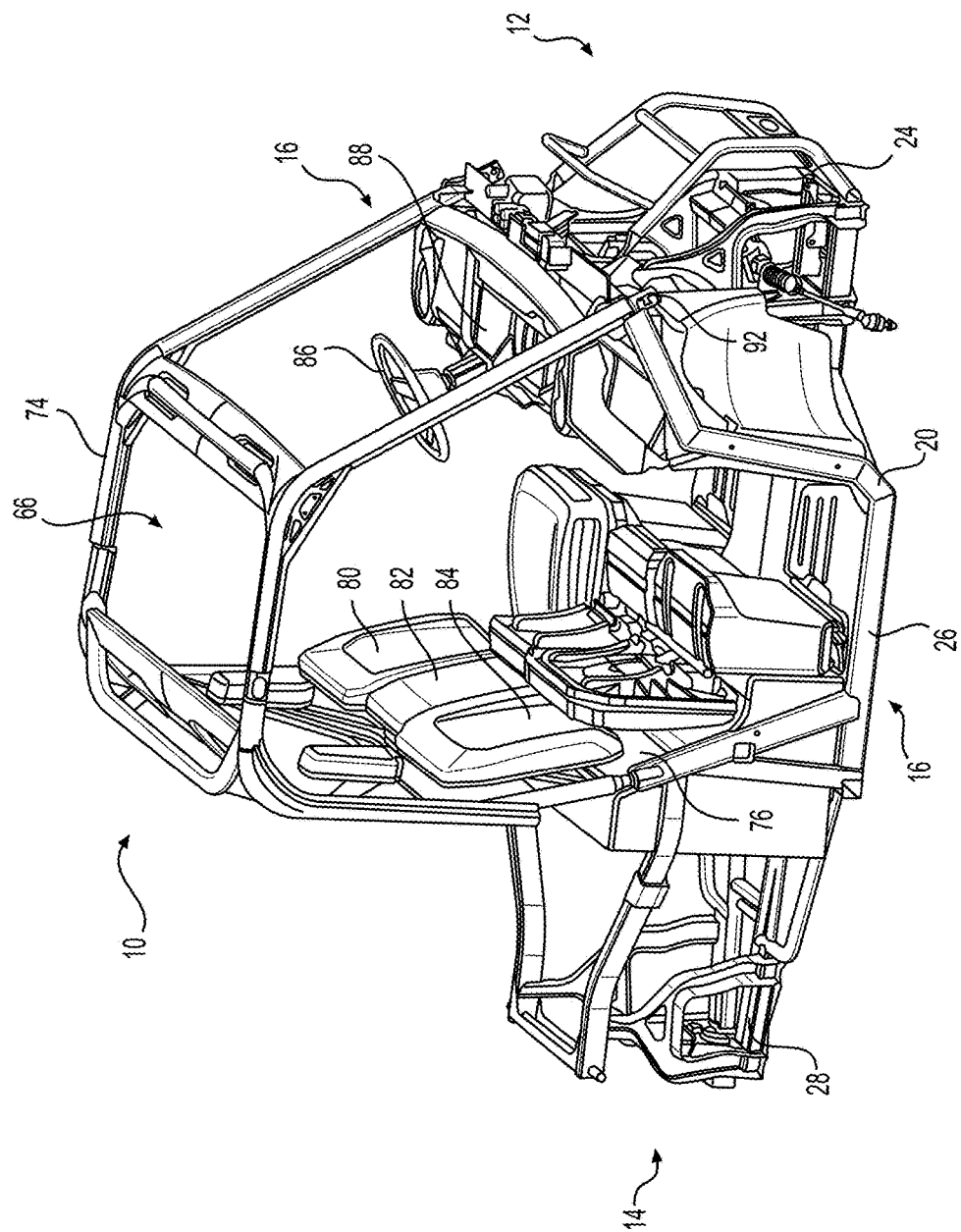
Figure 4:
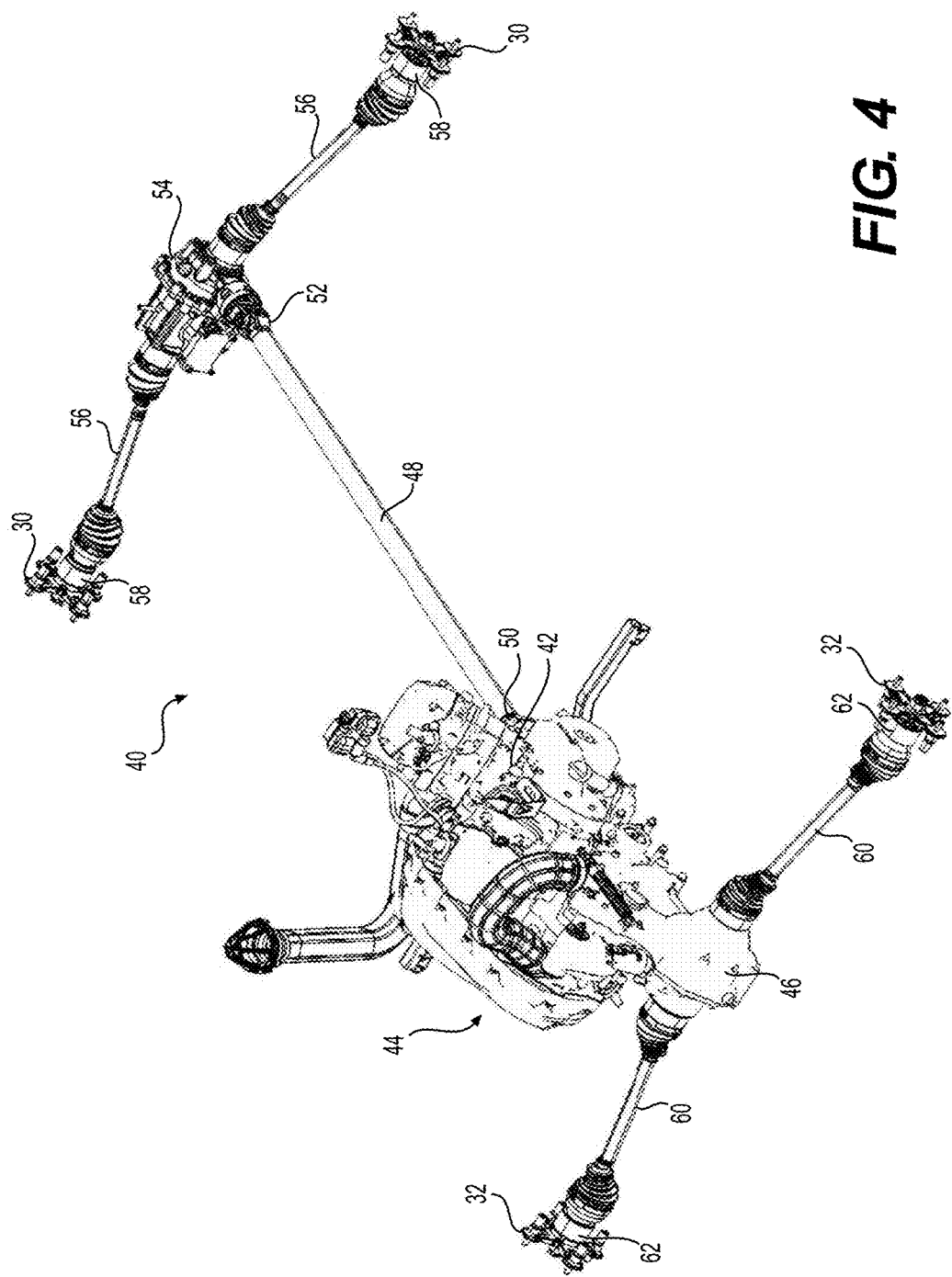

Referring to FIGS. 1 to 3, the vehicle 10 has a cargo box 64 disposed generally on the rear portion 28 of the frame 20. It is contemplated that the cargo box 64 could be pivotally connected to the frame 20 so as to provide access to components disposed in the rear portion 28 of the frame 20. The vehicle 10 has a cockpit area 66 disposed generally in the middle portion 26 of the frame 20. The cockpit area 66 has openings 68 on the left and right sides 16 of the vehicle 10 through which the riders can enter and exit the vehicle 10. Referring to FIG. 1, a lateral door 70 is disposed across each opening 68 (only a left lateral door 70 is being shown in FIG. 1). The lateral doors 70 are disposed across the openings 68 when the riders are riding the vehicle 10 and are opened by the driver and/or passenger when they desire to enter or exit the cockpit area 66. The cockpit area 66 is defined at its front by at least a front wall 72. A roll cage 74, connected to the frame 20, is disposed over the cockpit area 66. The cockpit area 66 is defined at its rear by a firewall 76 (better shown in FIG. 8) positioned in a lower rear portion of the roll cage 74. The cockpit area 66 is further defined by a roof 78 connected to a top portion of the roll cage 74. In some implementations, the roof 78 and the lateral doors 70 are removable from the vehicle 10. It is contemplated that the lateral doors 70 and/or the roof 78 could be omitted. The cockpit area 66 has a left seat 80 to accommodate a driver of the vehicle 10, and a middle seat 82 and a right seat 84 to accommodate two passengers (collectively referred to herein as riders). It is contemplated that the vehicle 10 could have only the left seat 80 and the right seat 84. Since the left seat 80, the middle seat 82 and the right seat 84 are distributed laterally, the vehicle 10 is referred to as a side-by-side vehicle, or SSV. It is contemplated that the vehicle 10 could have one or more additional rows of seats. The seat bottoms of the middle seat 82 and the right seat 84 can be tilted up to provide access to storage disposed under these seats 82, 84, as shown in FIG. 3. It is contemplated that the seat bottoms of one or more of these seats could be fixed. The seat bottom of the left seat 80 is fixed, but it is contemplated that it could also be tilted up. A steering assembly, including a steering wheel 86, is disposed in front of the left seat 80. The steering assembly is operatively connected to the two front wheels 30 to allow steering of the vehicle 10. As can be seen from the dotted lines shown in FIG. 2, the position of the steering wheel 86 can be adjusted. It is contemplated that the steering wheel 86 could have only a single fixed position. A dashboard 88 is attached to an upper portion of the front wall 72. A display cluster 90 is mounted to the dashboard 88, forward of the steering wheel 86. The display cluster 90 includes a number of screens and dials for the operation of the vehicle 10, such as a speedometer, odometer, engine speed indicator, fuel gauge, an engine temperature gauge, and the like. Additional details of side-by-side vehicles similar to the vehicle 10 can be found in International Patent Publication No. WO 2015/114604, published Aug. 6, 2015, the entirety of which is incorporated herein by reference.

Figure 5:
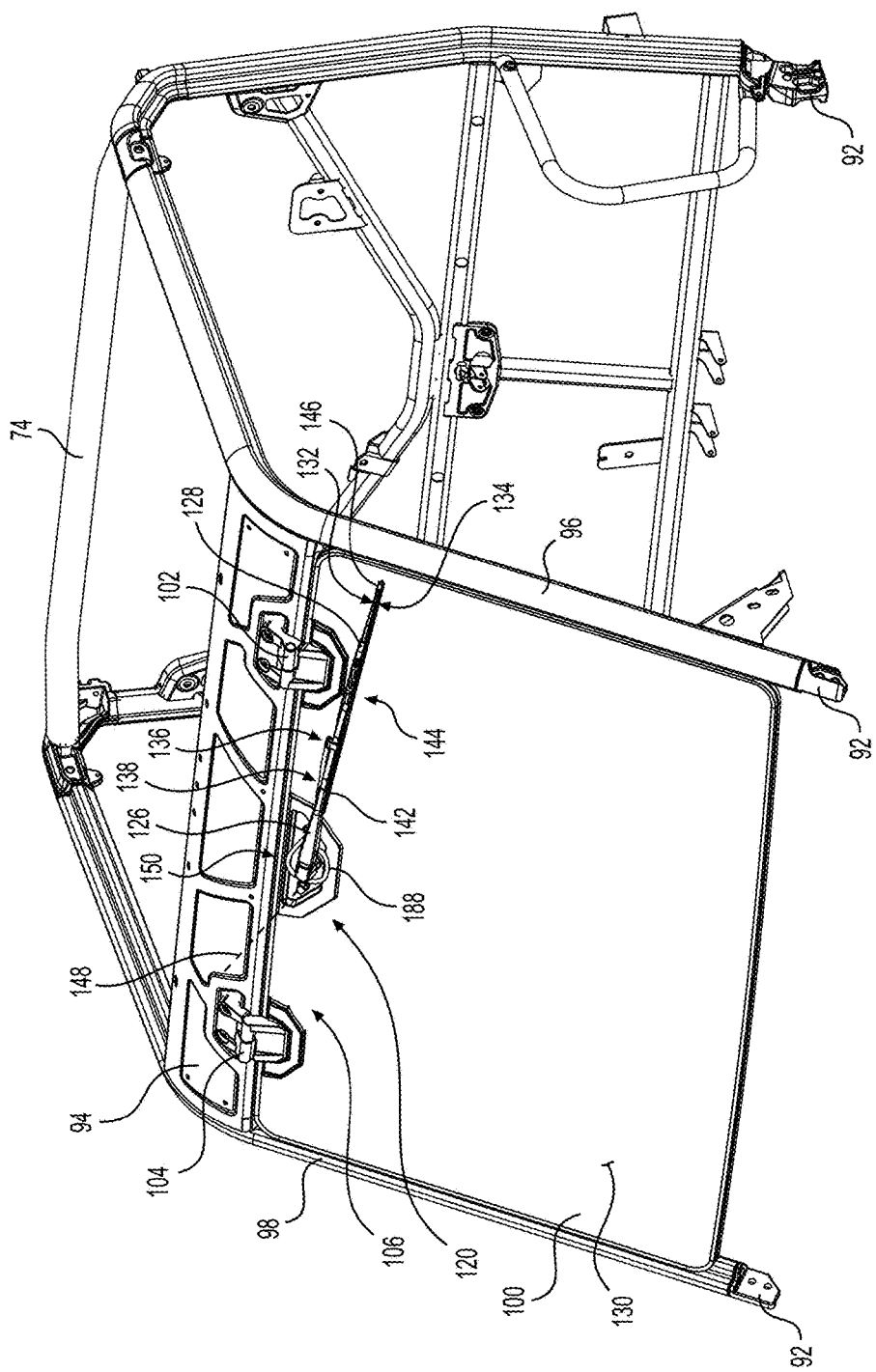

Referring to FIGS. 3 and 5, the roll cage 74 connects to the frame 20 through a plurality of connections 92. The roll cage 74 is composed mostly of tubular members made of a suitable material, such as steel or aluminium alloy. In the upper front portion of the roll cage 74, a front transverse member 94 extends between the upper portions of pillars 96, 98. A windshield 100 is connected to the front transverse member 94 of the roll cage 74 through hinges 102, 104. It is contemplated that the windshield 100 could be connected to the roll cage 74 otherwise. The windshield 100 extends laterally between the pillars 96, 98, thus covering a majority of the frontal width of the roll cage 74 and thus protecting the cockpit area 66 from wind, dust, debris, rain and snow. FIG. 7 illustrates the windshield 100 pivoted upwardly with respect to the roll cage 74 thanks to the hinges 96, 98 connected between an upper portion 106 of the windshield 100 and a top portion of the front transverse member 94. The windshield 100 can be locked to the frame 20 in the position shown in FIGS. 5 and 6 or unlocked to be pivoted upwardly as shown in FIG. 7 using a lever 108 (better shown in FIGS. 7 to 9). The lever 108 is connected to the interior side 110 of the windshield 100 in a lower portion thereof. The lever 108 is thus accessible to the riders from the cockpit area 66. The lever 108 is rotated by the riders, causing a latch 112 to release the windshield 100 from the frame 20. The windshield 100 can thus be pivoted upwardly to provide access to the cockpit area 66. Pneumatic cylinders 114, 116 (better shown in FIGS. 8 and 9) are connected to the lateral portions of the windshield 100 and to the roll cage 74. The pneumatic cylinders 114, 116 facilitate the upward pivoting of the windshield 100 for the riders from the cockpit area 66 and maintain the windshield 100 pivoted upwardly. In some implementations, the windshield 100 can be pivoted upwardly in different preselected positions with respect to the frame 20.

Figure 6:
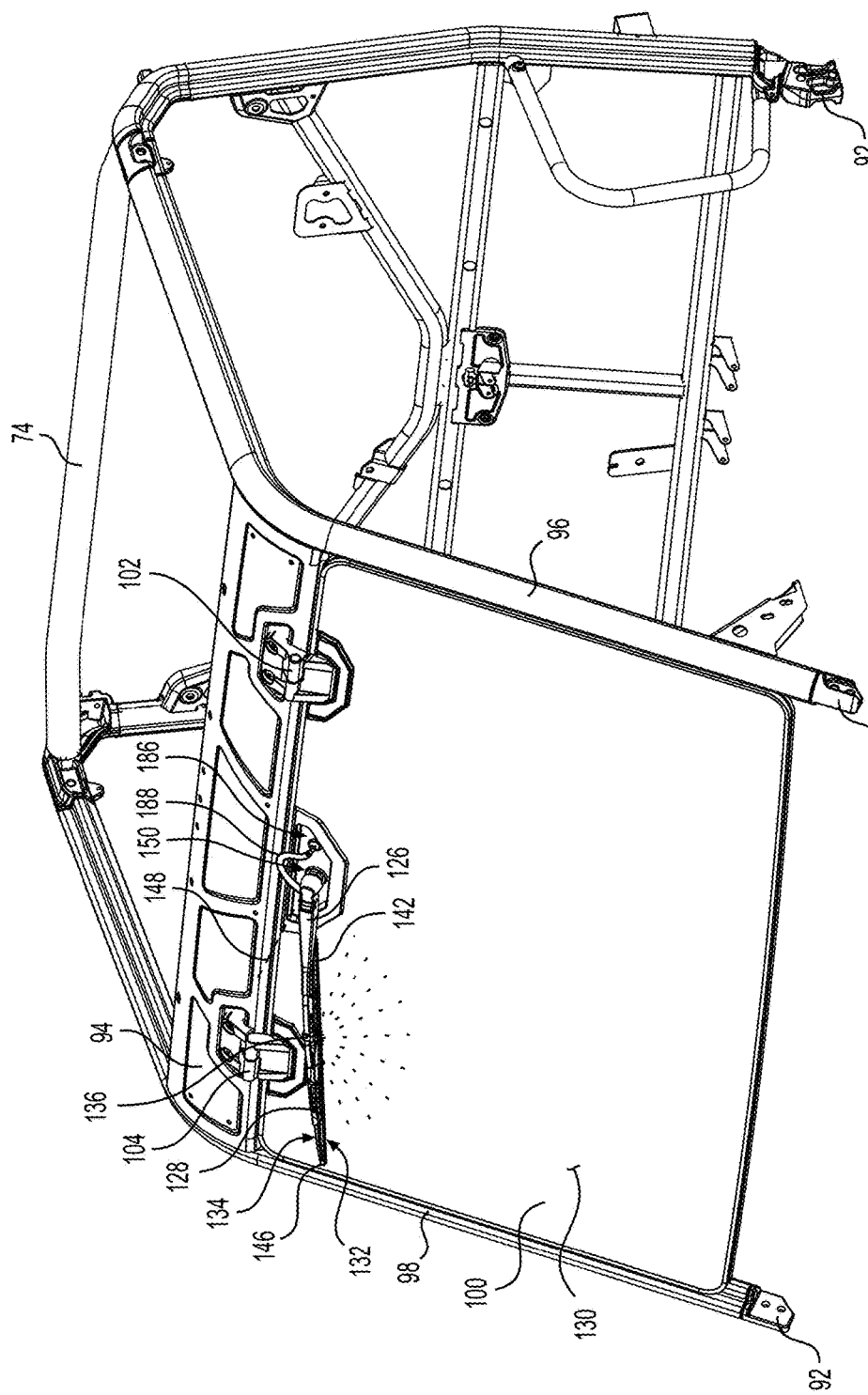
Figure 7:
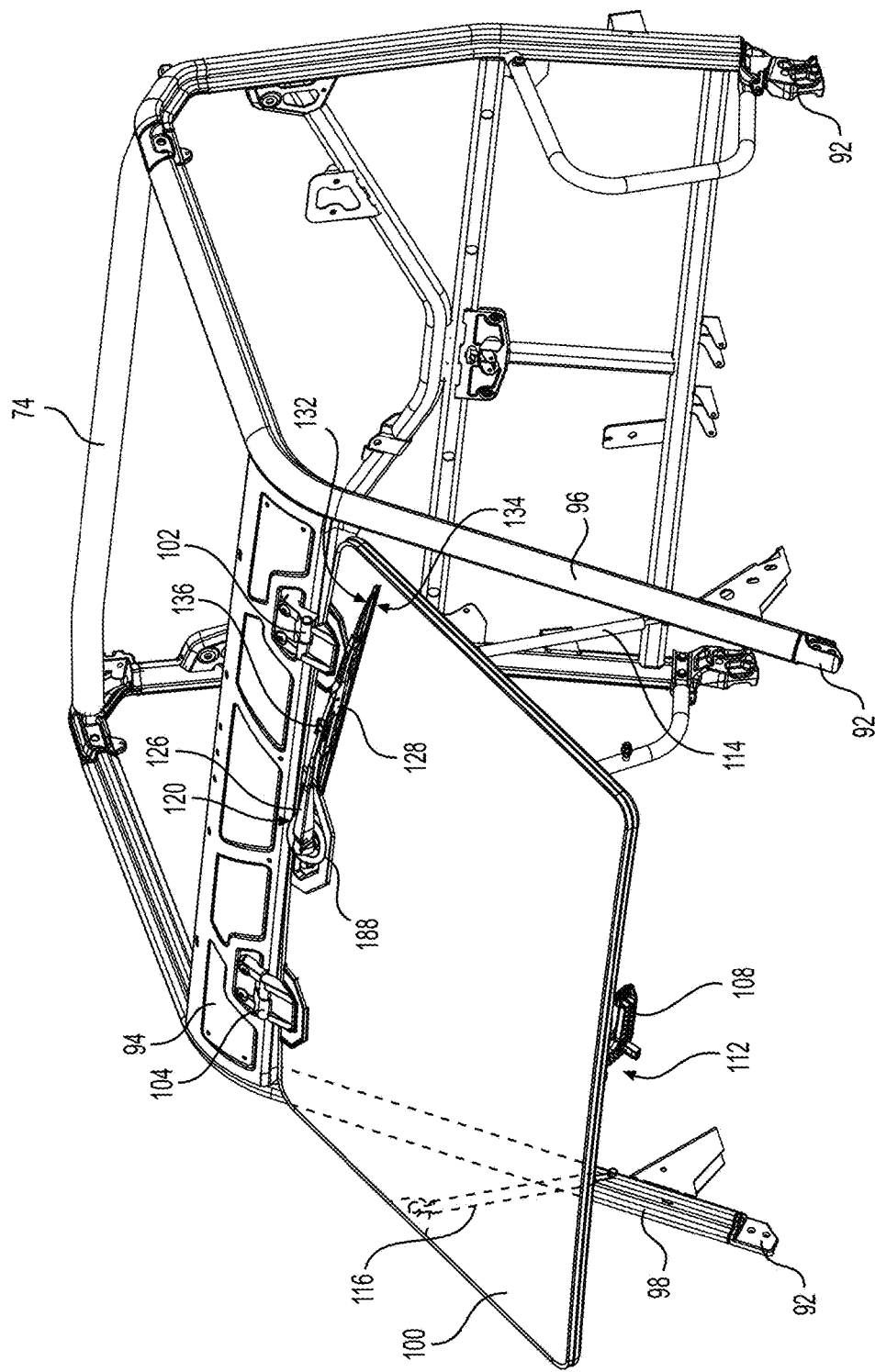
Figure 10:
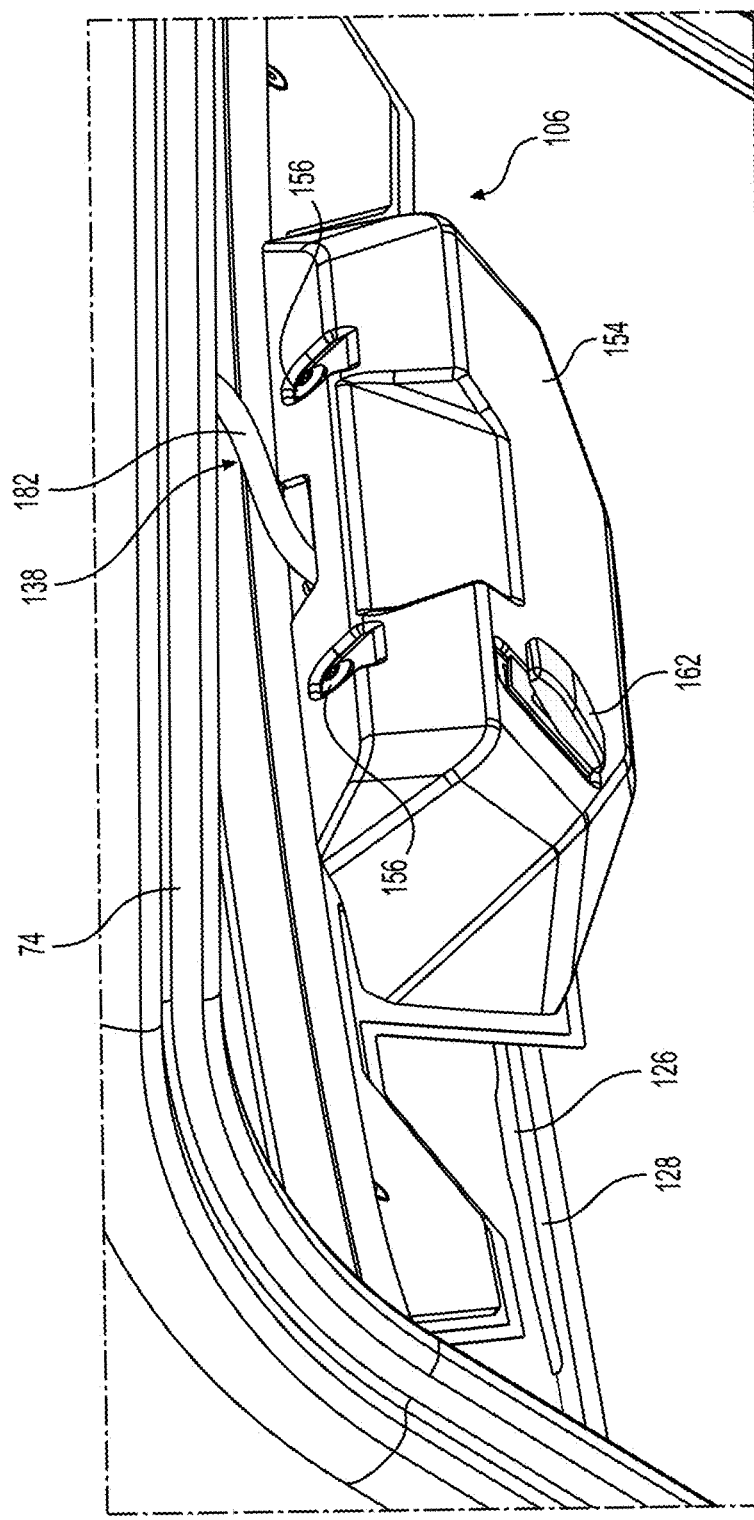
Figure 11:
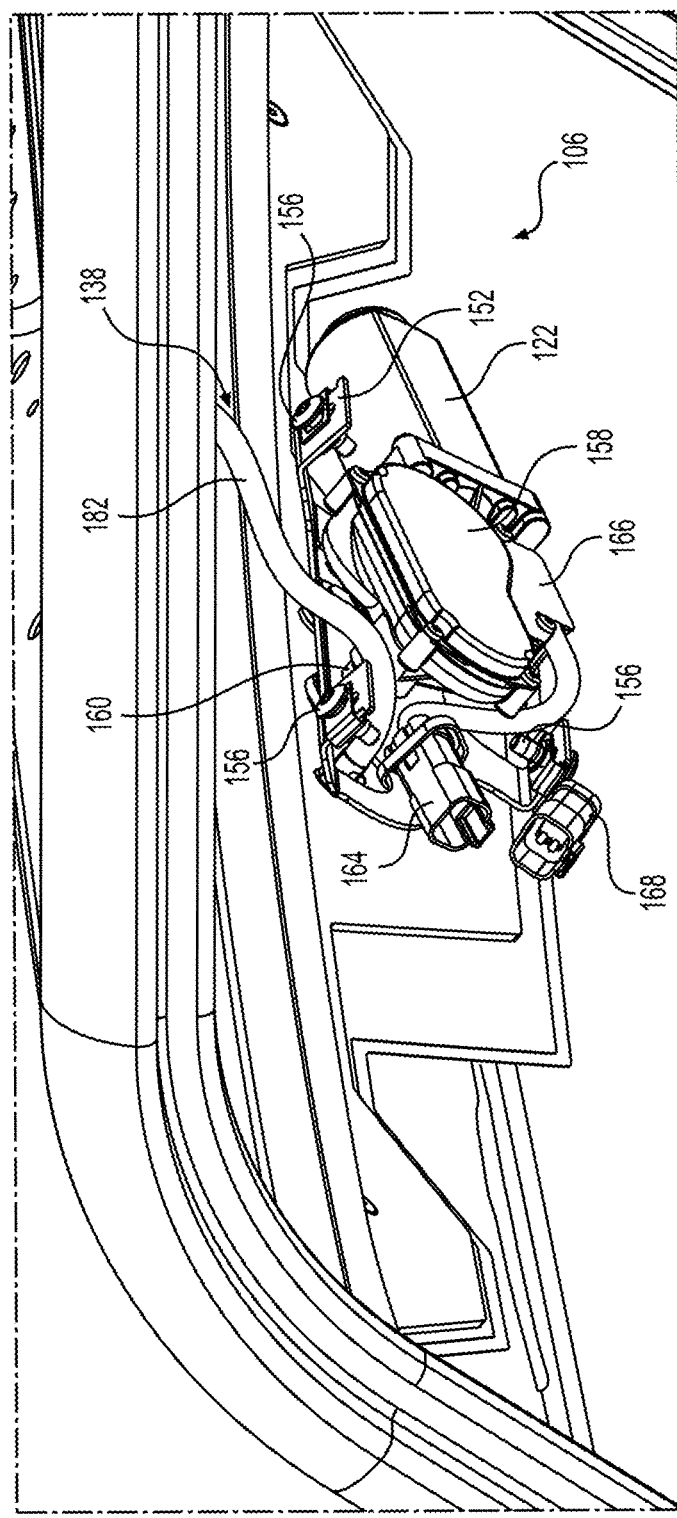
Figure 12:
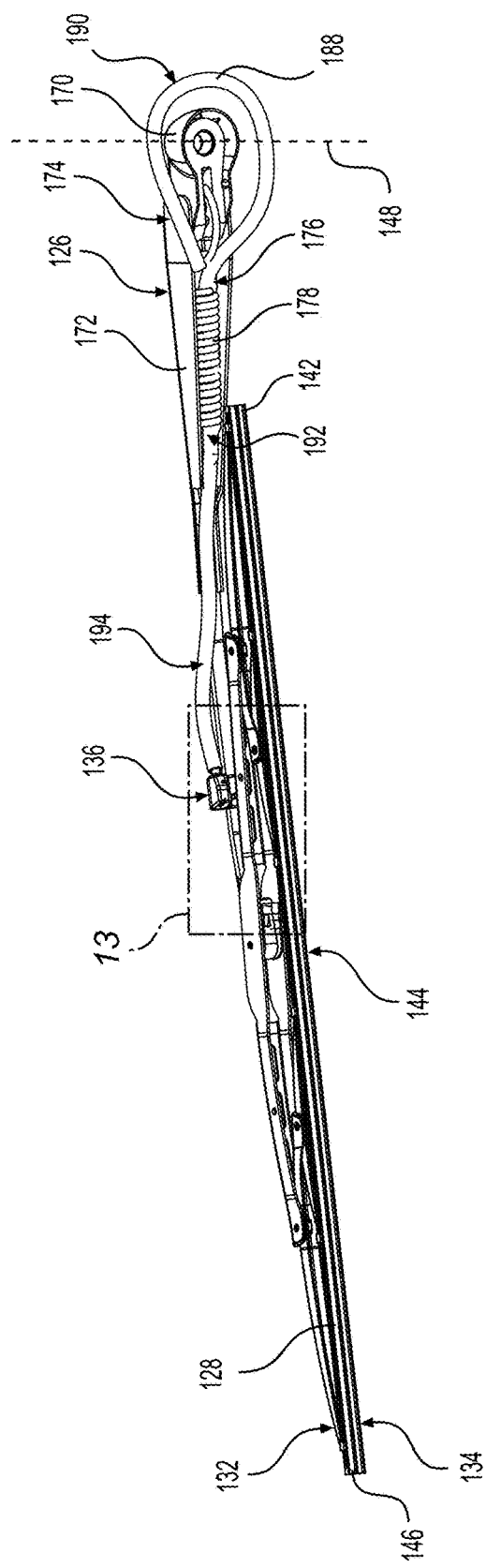
Figure 13:
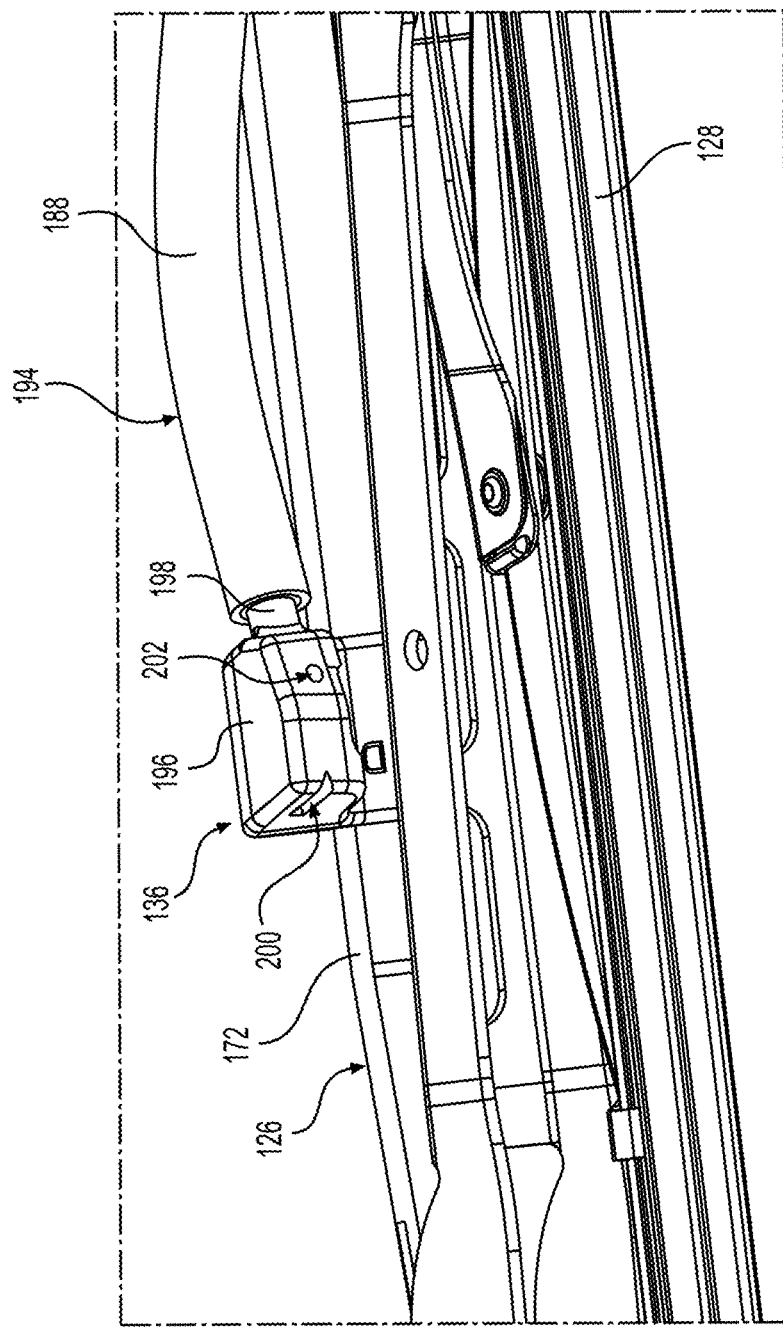

Referring to FIGS. 1 and 5 to 13, a wiper assembly 120 connected to the upper portion 106 of the windshield 100 will now be described in more detail. The wiper assembly 120 includes a wiper motor 122 (shown in FIG. 11) connected to the upper portion 106 of the windshield 100, a reservoir 124 (shown in FIG. 8) connected to the frame 20 of the vehicle 10, and a wiper arm 126 pivotally connected to the upper portion 106 of the windshield 100. The wiper motor 122, when in operation, pivots the wiper arm 126 between a stowed position (shown in FIG. 5) and a pivoted position (shown in FIG. 6) in a back and forth manner. The wiper assembly 120 further includes a wiper blade 128 connected to the wiper arm 126. The wiper blade 128 is in contact with a surface 130 of the windshield 100. The wiper blade 128 is pivotable with the wiper arm 126 between the stowed position and the pivoted position. As the wiper arm 126 is pivoted back and forth between the stowed position and the pivoted position by the action of the wiper motor 122, the wiper blade 128 wipes and cleans the surface 130 of the windshield 100. Thus, it can be appreciated that, when the wiper motor 122 is in operation, the wiper blade 128 pivots so as to define an arc on the surface 130 of the windshield 100. The wiper blade 128 has a side 132 and a side 134. As can be seen in FIGS. 5, 12 and 13, the side 132 is above the side 134 when the wiper blade 128 is in the stowed position. As can be seen in FIG. 6, the side 132 is below the side 134 when the wiper blade 128 is in the pivoted position. The wiper assembly 120 further includes a sprayer 136 connected to the wiper arm 126. The sprayer 136 is fluidly connected to the reservoir 124 through a conduit 138. A pump 140 is connected to the reservoir 124 and to the conduit 138 for delivering a fluid from the reservoir 124 to the sprayer 136. The wiper assembly 120 can thus be selectively activated for spraying the fluid on the surface 130 of the windshield 100 for improved removal of debris and cleaning of the windshield 100.

When the wiper arm 126 is in the stowed position, as illustrated in FIG. 5, it can be seen that the entire wiper blade 128 is on a driver side of the windshield 100. It is contemplated that, in the stowed position, a portion of the wiper blade 128 could be on a passenger side of the windshield 100, such that a majority of the wiper blade 128 remains on the driver side of the windshield 100. The wiper blade 128 has an inner end 142, a center portion 144 and an outer end 146. The wiper blade 128 extends downwardly from the inner end 142 to the outer end 146, the outer end 146 being proximate to the pillar 96.

When the wiper arm 126 is in the pivoted position, as illustrated in FIG. 6, it can be seen that the entire wiper blade 128 is on a passenger side of the windshield 100. It is contemplated that, in the pivoted position, a portion of the wiper blade 128 could be on the driver side of the windshield 100, such that a majority of the wiper blade 128 remains on the passenger side of the windshield 100. The wiper blade 128 extends downwardly from the inner end 142 to the outer end 146, the outer end 146 being proximate to the pillar 98.

Referring to FIGS. 5 and 6, the wiper arm 126 pivots about a pivot axis 148. The pivot axis 148 is positioned at a lateral center 150 of the windshield 100. In one implementation, the wiper arm 126 pivots about the pivot axis 148 by an angle between 165° and 175° between the stowed position and the pivoted position, but other angles are contemplated. The wiper blade 128 thus covers a majority of the surface 130 of the windshield 100 when pivoted back and forth between the stowed position and the pivoted position.

Figure 9:
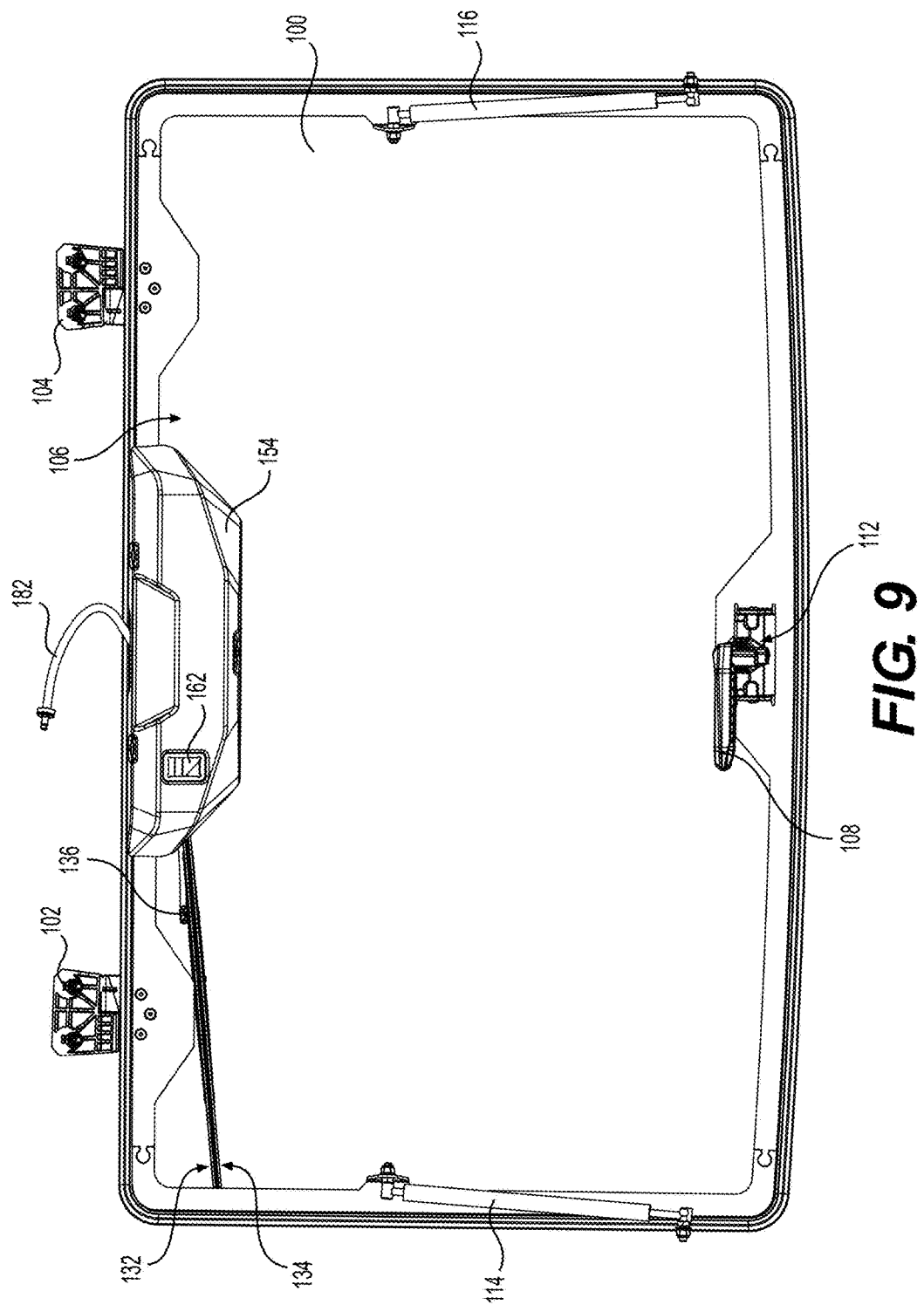

Referring to FIGS. 9 to 11, the wiper motor 122 is connected to the upper portion 106 of the windshield 100 through a bracket 152. The wiper motor 122 is received in a wiper motor housing 154 positioned on the interior side 110 of the windshield 100. The bracket 152 includes fasteners 156 for connecting the wiper motor housing 154 to the bracket 152. A gearbox 158 is connected to the wiper motor 122. The gearbox 158 is connected to a shaft 160. The shaft 160 passes through the windshield 100 and connects to the wiper arm 126 on the exterior side of the windshield 100. The gearbox 158 is configured to pivot the shaft 160 back and forth so that the wiper arm 126 is pivoted back and forth between the stowed position and the pivoted position. The gearbox 158 is adapted to cause the back and forth motion of the shaft 160 while the wiper motor 122 revolves only in one direction. The shaft 160 is coaxial with the pivot axis 148 (shown in FIGS. 5 and 6) of the wiper arm 126. In other words, when activated, the wiper motor 122 causes the back and forth pivoting of the shaft 160, and the wiper arm 126 pivots accordingly about the pivot axis 148.

Referring to FIGS. 10 and 11, an actuator 162 is connected to the wiper motor housing 154. A motor connector 164 is provided to electronically connect the actuator 162 to the wiper motor 122 through a wiper motor control unit 166. The wiper motor control unit 166 is connected to the electrical system of the vehicle 10 and provide electric power to the wiper motor 122. The actuator 162 is thus electronically connected to the wiper motor 122 for selectively causing the wiper motor 122 to pivot the wiper arm 126 back and forth between the stowed position and the pivoted position. The actuator 162 is further electronically connected to the pump 140 through a pump connector 168 for activating the pump 140 to pump the fluid from the reservoir 124 to the sprayer 136. Thus, the actuator 162 can selectively activate the wiper arm 122 and the pump 140. The actuator 162 is a three-position switch having the following positions: an "off" position, returning the wiper arm 126 in the stowed position and turning off the wiper assembly 120; an "on" position activating the wiper motor 122; and a "spray" position for activating the pump 140. The actuator 162 moves from the "off" position to the "on" position and from the "on" position to the "spray" position. When released from the "spray" position, the actuator 162 returns to the "on" position. It is contemplated that the actuator 162 could differ from the one illustrated in the Figures. For instance, the actuator 162 could be a lever positioned on the dashboard 88 of the vehicle 10 having similar "off", "on" and "spray" positions as described above. Moreover, it is contemplated that the actuator 162 could be in the form of a two push button switch. A first push button could be pressed by the rider from an "off" position returning the wiper arm 126 in the stowed position and turning off the wiper assembly 120 into an "on" position activating the wiper motor 122. A second push button could be pressed by the rider from an "off" position turning off the pump 140 into a "spray" position activating the pump 140 and, when released from the "spray" position, the second push button could return to the "off" position. It is further contemplated that the actuator 162 could have various intermediate "on" positions for causing the wiper motor 122 to pivot the wiper arm 126 intermittently or at various speeds between the stowed position and the pivoted position.

Referring to FIG. 12, the wiper arm 126 includes a hub 170 and an elongated member 172. The hub 170 connects to the shaft 160. The elongated member 172 is connected to the wiper blade 128. The elongated member 172 is pivotally connected to the hub 170 through a wiper arm hinge 174. The elongated member 172 can thus be pivoted with respect to the hub 170 and away from the surface 130 of the windshield 100 to lift the wiper blade 128 from the surface 130 of the windshield 100. The elongated member 172 defines a channel 176 that is open on the side of the elongated member 172 facing the surface 130 of the windshield 100. A spring 178 is received in the channel 176. The spring 178 is connected to the hub 170 at one end and to the elongated member 172 at another end. The spring 178 is configured to bias the elongated member 172 toward the surface 130 of the windshield 100 so that the wiper blade 128 remains in contact with the surface 130 of the windshield 100.

Still referring to FIG. 12, the sprayer 136 is connected to the elongated member 172 of the wiper arm 126. The sprayer 136 is positioned between and spaced apart from the ends of the elongated member 172 of the wiper arm 126. It is contemplated that the sprayer 136 could also be connected to the wiper blade 128, on the center portion 144 thereof. As can be seen in FIGS. 5 and 12, the sprayer 136 is positioned above the wiper blade 128 when the wiper arm 126 is in the stowed position. Accordingly, the sprayer 136 is positioned above the side 132 of the wiper blade 128 when the wiper arm 126 is in the stowed position. In contrast and as can be seen in FIG. 6, the sprayer 136 is positioned below the wiper blade 128 when the wiper arm 126 is in the pivoted position.

Accordingly, the sprayer 136 is positioned below the side 132 of the wiper blade 128 when the wiper arm 126 is in the pivoted position.

Figure 8:
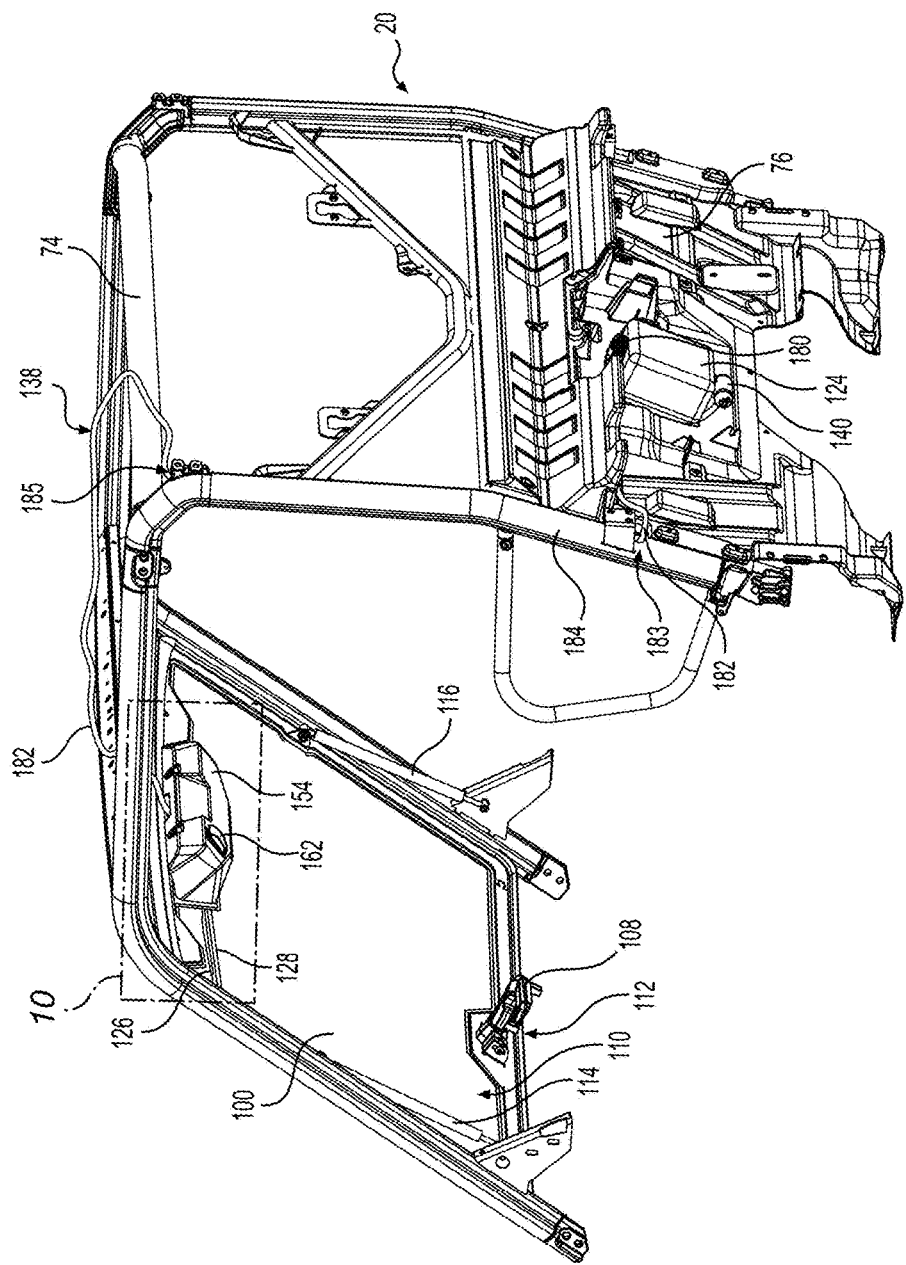

Referring to FIG. 8, the reservoir 124 is connected to the firewall 76, on a rear side thereof. The reservoir 124 can be filled with any fluid suitable for washing the windshield 100, such as water or windshield washer fluid. It is contemplated that the reservoir 124 could be accessed by a user by pivoting the cargo box 64 (shown in FIG. 1) upwardly with respect to the rear portion 28 of the frame 20 and by removing a cap 180 of the reservoir 124. It is also contemplated that the reservoir 124 could be connected to the frame 20 of the vehicle 10 at any other suitable location. The pump 140 is connected under the reservoir 124. It is contemplated that the pump 140 could be connected to the vehicle 10 at any other suitable location. It is also contemplated that the pump 140 could be positioned inside the reservoir 124. The pump 140 is an electric pump powered by the electrical system of the vehicle 10.

Referring to FIGS. 8 to 13, a conduit 138 extending between the pump 140 and the sprayer 136 for delivering the fluid from the reservoir 124 to the sprayer 136 will now be described. The conduit 138 includes a hose 182. The hose 182 is made of a flexible material, such as rubber. The hose 182 extends from the pump 140 along the rear side of the firewall 76. The hose 182 is inserted in a hole 183 defined in a lower portion of a rear left pillar 184 of the roll cage 74. The hose 182 exits the rear left pillar 184 through a hole 185 defined in an upper portion of the rear left pillar 184. The hose 182 then extends along the top portion of the roll cage 74, then inside the roof 78 (omitted in FIG. 8) and inside the wiper motor housing 154. A portion of the hose 182 passes through the bracket 152 so as to fluidly connect to a nipple (not shown) positioned on the interior side 110 of the windshield 100. Referring to FIG. 6, a nipple 186 is positioned on the exterior side of the windshield 100, the nipple 186 being fluidly connected to the nipple on the interior side 110 of the windshield 100, both nipples being part of the conduit 138. A hose 188 is fluidly connected to the nipple 186 and extends from the nipple 186 to the sprayer 136. The hose 188 is also part of the conduit 138. The hose 188 has a section 190 partially circling around the hub 170 of the wiper arm 126. The hose 188 has a further section 192 extending through the channel 176 of the elongated member 172 and coaxially inside the spring 178. The hose 188 can thus freely move with the wiper arm 126 between the stowed position and the pivoted position while being received in the channel 176 at least partly in section 192. The hose 188 further extends to a section 194 which is connected to the sprayer 136. The sprayer 136 is defined by a sprayer housing 196. The sprayer housing 196 includes a nipple 198. The nipple 198 is also part of the conduit 138. The section 194 of the hose 188 connects to the nipple 198 for delivering the fluid from the reservoir 124 to the sprayer 136.

Referring to FIG. 13, the sprayer housing 196 further includes a spray outlet 200 and a spray outlet 202. As shown in FIG. 6, the spray outlet 200 is configured to spray the fluid on the surface 130 of the windshield 100 toward a region between the center portion 144 and the outer end 146 of the wiper blade 128, and away from the side 132 of the wiper blade 128. As shown in FIG. 6, the spray outlet 202 is configured to spray the fluid on the surface 130 of the windshield 100 toward a region between the center portion 144 and the inner end 142 of the wiper blade 128, and away from the side 132 of the wiper blade 128. It is to be noted that the position of the sprayer 136 on the wiper arm 126 and the configuration of the spray outlets 200, 202 are such that the fluid is only sprayed on the surface 130 of the windshield 100 which is on the first side 132 of the wiper blade 128, and away from the first side 132 of the wiper blade 128.

Referring to FIGS. 5 to 13, an illustrative scenario of the operation of the wiper assembly 120 for cleaning the windshield 100 will now be described. The illustrative scenario is based on the hypothesis that the windshield 100 is initially dry but dirty, i.e. fine debris such as dust cover the surface 130 of the windshield 100. At the beginning, the actuator 162 is moved by the rider from the "off" position to the "on" position, and from the "on" position to the "spray" position so as to activate the wiper motor 122 and the pump 140. The wiper motor 122 thus causes the wiper arm 126 to pivot between the stowed position and the pivoted position. During the initial pivoting of the wiper arm 126 between the stowed position and the pivoted position, the side 134 of the wiper blade 128 wipes and picks up some of the dry debris from the surface 130 of the windshield 100. These dry debris thus form a line of debris at the pivoted position of the wiper blade 128. Simultaneously, the fluid is pumped from the reservoir 124 to the sprayer 136 through the conduit 138. The fluid is thus sprayed by the sprayer 136 on the surface 130 of the windshield 100 in a direction opposite to the direction of motion of the wiper blade 128 as the wiper blade 128 pivots from the stowed position to the pivoted position, and in the direction of motion of the wiper blade 128 as the wiper blade 128 pivots from the pivoted position to the stowed position. As the wiper arm 126 is pivoted from the pivoted position to the stowed position, the side 132 of the wiper blade 128 wipes and picks up the sprayed fluid and debris that was not picked up during the initial wipe of the surface 130 of the windshield 100. When the rider is satisfied that a sufficient quantity of fluid has been sprayed on the surface 130 of the windshield 100, the rider releases the actuator 162 and the actuator 162 returns to the "on" position. As the cycle of the wiper arm 126 pivoting back and forth between the stowed position and the pivoted position is repeated, the side 134 wipes and picks up the fluid and debris that remain on the surface 130 of the windshield 100. At the end, when the rider is satisfied that the windshield 100 has been cleaned sufficiently by the combined action of the wiper blade 128 and the fluid, the actuator 162 is positioned by the rider into the "off" position.

Once the wiper blade 128 is returned to the stowed position and since the side 132 of the wiper blade 128 has wiped and picked up the majority of the fluid on the surface 130 of the windshield 100, the fluid found on the side 132 of the wiper blade 128 can drain from the inner end 142 to the outer end 146 of the wiper blade 128. The fluid can thus drain on the surface 130 of the windshield 100 generally along the pillar 96. By draining along the pillar 96, the fluid generally does not obstruct the view of the driver through the windshield 100.

Figure 14:
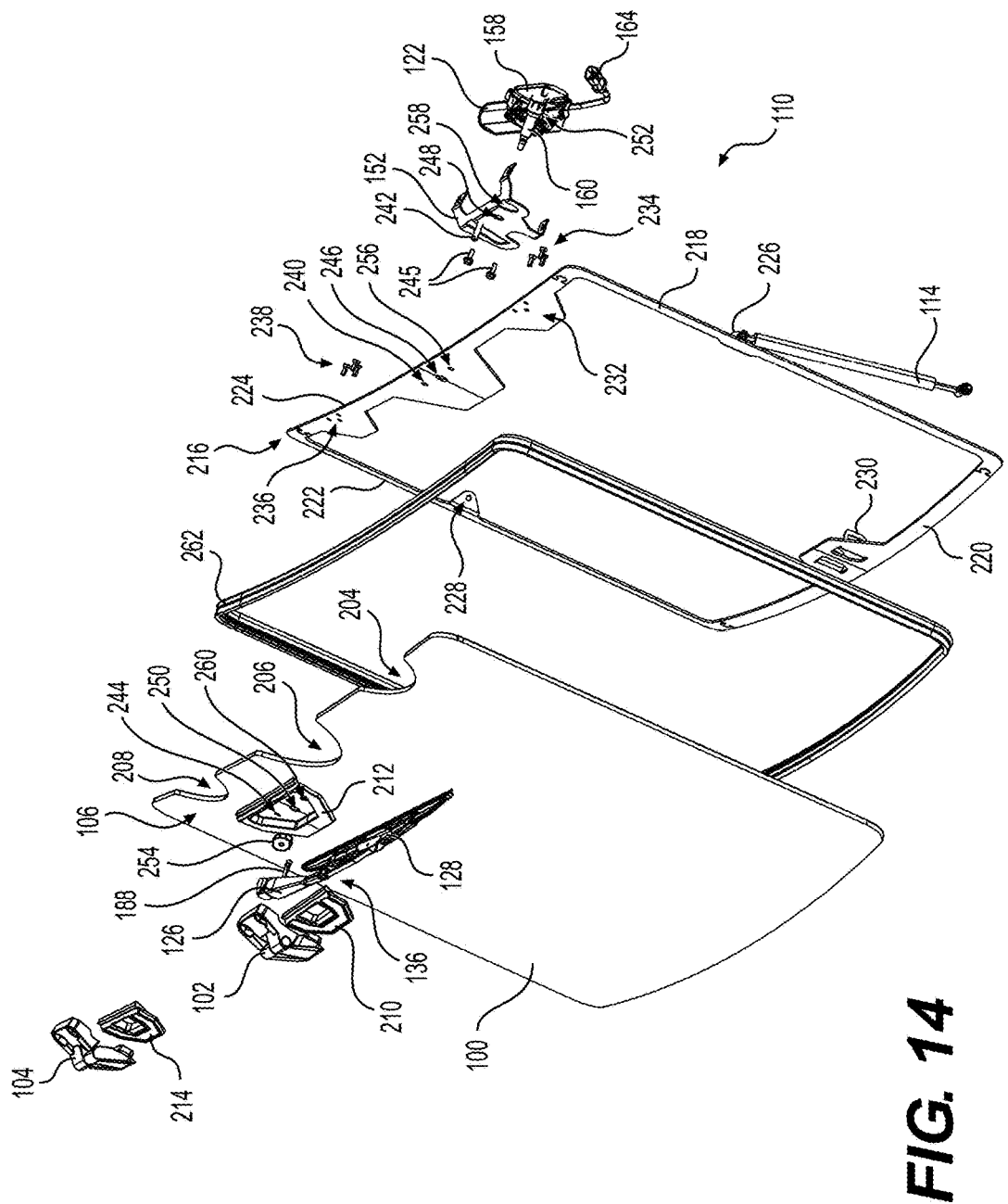

Turning now to FIG. 14, the windshield 100 and the wiper assembly 120 will be described in more detail. The windshield 100 is made of a clear material. In the implementation shown, the windshield 100 is made of laminated glass. The windshield 100 includes a driver-side recess 204, a center recess 206 and a passenger-side recess 208. The recesses 204, 206, 208 are defined in the upper portion 106 of the windshield 100. The recesses 204, 206, 208 are adapted to receive a driver-side cap 210, a center cap 212 and a passenger-side cap 214 respectively and to allow passage of various components of the wiper assembly 120. The driver-side cap 210 and the passenger-side cap 214 are adapted to receive the hinges 102, 104 respectively.

A windshield frame 216 is bonded to the interior side of the windshield 100 using an adhesive. The windshield frame 216 is made of four members: a drive-side member 218, a bottom member 220, a passenger-side member 222 and a top member 224. The driver-side member 218 includes a tab 226 for connecting the pneumatic cylinder 114. The passenger-side member 222 includes a tab 228 for connecting the pneumatic cylinder 116 (not shown in FIG. 14). The bottom member 224 includes tabs 230 (only one of which is shown) for connecting the lever 108 (shown in FIG. 9). The top member 224 includes driver-side holes 232 adapted to receive driver-side fasteners 234 for connecting the windshield frame 216 to the hinge 102. The top member 224 also includes passenger-side holes 236 adapted to receive passenger-side fasteners 238 for connecting the windshield frame 216 to the hinge 104.

The wiper motor 122 and the gearbox 158 are fastened to the bracket 152 using fasteners 245. An anti-rotation pin 242 extends from the bracket 152, through a hole 240 defined in the top member 224 and through a hole 244 defined in the center cap 212. The anti-rotation pin 242 prevents the wiper motor 122 and the gearbox 158 from rotating with respect to the windshield 100 during operation of the wiper assembly 120.

The gearbox 158 has a sleeve 252 extending partially over the shaft 160. The shaft 160 and the sleeve 252 both extend from the gearbox 158 toward the exterior side of the windshield 100. The shaft 160 and the sleeve 252 extend through a hole 248 defined in the bracket 152, then through a hole 246 defined in the top member 224 and then through a hole 250 defined in the center cap 212 so as to connect the shaft 160 to the wiper arm 126, as described above. The sleeve 252 has a threaded portion extending to the exterior side of the windshield 100. A nut 254 is positioned on the exterior side of the center cap 212 and is fastened onto the threaded portion of the sleeve 252 of the gearbox 158. Hence, the nut 254 connects the center cap 212, the gearbox 158, the wiper motor 122 and the bracket 152 to the upper portion 106 of the windshield 100 via the top member 224.

The bracket 152 has a hole 258 allowing passage of the hose 182 (shown in FIG. 11). The top member 224 includes a hole 256 adapted to receive the nipple (not shown) positioned on the interior side 110 of the windshield 100 so that the hose 182 connects to the nipple. The center cap 212 also includes a hole 260 aligned with the hole 256 in the top member 224 and the hole 258 in the bracket. The hole 260 in the center cap 212 is adapted to receive the exterior nipple 186 (shown in FIG. 6) so that the exterior hose 188 connects thereto.

A seal 262 is connected to the exterior edges of the windshield 100 and windshield frame 216 assembly. The seal 262 is made of a compliant material, such as rubber. The seal 262 is configured to fill a gap between the frame 20 of the vehicle 10 and the windshield 100 and windshield frame 216 assembly when the windshield 100 is locked to the fame 20, as shown in FIGS. 5 and 6.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
at least one seat connected to the frame;
an engine connected to the frame;
a plurality of ground engaging members operatively connected to the frame, at least one ground engaging member of the plurality of ground engaging members being operatively connected to the engine;
a windshield connected to the frame, the windshield having an upper portion; and
a wiper assembly connected to the upper portion of the windshield, the wiper assembly comprising:
a wiper motor connected to the upper portion of the windshield;
a reservoir connected to the frame;
a wiper arm pivotally connected to the upper portion of the windshield, the wiper arm being operatively connected to the wiper motor, the wiper motor selectively pivoting the wiper arm between a stowed position and a pivoted position;
a wiper blade connected to the wiper arm, the wiper blade being in contact with a surface of the windshield, the wiper blade being pivotable with the wiper arm between the stowed position and the pivoted position, the wiper blade having a first side and a second side, the first side being above the second side in the stowed position, the first side being below the second side in the pivoted position; and
a sprayer connected to the wiper arm, the sprayer being fluidly connected to the reservoir, the sprayer being configured for spraying a fluid only on the surface of the windshield away from the first side of the wiper blade.

2. The vehicle of claim 1, wherein the wiper motor is positioned on an interior side of the windshield and the wiper arm is positioned on an exterior side of the windshield.

3. The vehicle of claim 2, further comprising a wiper motor housing connected to the interior side of the windshield, the wiper motor being received in the wiper motor housing.

4. The vehicle of claim 1, further comprising an actuator electronically connected to the wiper motor for selectively causing the wiper motor to pivot the wiper arm between the stowed position and the pivoted position.

5. The vehicle of claim 1, wherein, when the wiper arm is in the stowed position, at least a majority of the wiper blade is on a driver side of the windshield.

6. The vehicle of claim 4, wherein, when the wiper arm is in the stowed position, the wiper blade extends downwardly from an inner end to an outer end of the wiper blade.

7. The vehicle of claim 1, wherein, when the wiper arm is in the pivoted position, at least a majority of the wiper blade is on a passenger side of the windshield.

8. The vehicle of claim 7, wherein, when the wiper arm is in the pivoted position, the wiper blade extends downwardly from an inner end to an outer end of the wiper blade.

9. The vehicle of claim 1, wherein the windshield is pivotally connected to the frame.

10. The vehicle of claim 9, further comprising hinges pivotally connecting the upper portion of the windshield to the frame.

11. The vehicle of claim 9, wherein the wiper motor, the wiper arm and the wiper blade pivot together with the windshield.

12. The vehicle of claim 1, wherein the wiper arm pivots about a pivot axis, the pivot axis being at a lateral center of the windshield.

13. The vehicle of claim 1, wherein the wiper assembly further comprises a shaft, the shaft being operatively connected to the wiper motor and to the wiper arm, the shaft being coaxial with a pivot axis of the wiper arm, and the wiper motor selectively pivots the shaft and the wiper arm about the pivot axis.

14. The vehicle of claim 1, wherein the sprayer is positioned between and spaced apart from the ends of the wiper arm.

15. The vehicle of claim 1, wherein the sprayer comprises a first spray outlet and a second spray outlet.

16. The vehicle of claim 1, wherein the wiper assembly further comprises a pump fluidly connected to the reservoir for pumping the fluid from the reservoir to the sprayer.

17. The vehicle of claim 16, further comprising at least one actuator electronically connected to the wiper motor for selectively causing the wiper motor to pivot the wiper arm between the stowed position and the pivoted position, the at least one actuator being further electronically connected to the pump for selectively pumping the fluid from the reservoir to the sprayer.

18. The vehicle of claim 1, wherein the wiper assembly further comprises a conduit extending between the reservoir and the sprayer for delivering the fluid from the reservoir to the sprayer; and wherein the conduit comprises at least one hose.

19. The vehicle of claim 18, wherein the wiper arm defines a channel and at least a portion of the at least one hose is received in the channel of the wiper arm.

20. The vehicle of claim 1, wherein the sprayer is positioned above the wiper blade when the wiper arm is in the stowed position, and the sprayer is positioned below the wiper blade when the wiper arm is in the pivoted position.

* * * * *